United States Patent
Walter et al.

(10) Patent No.: US 12,261,279 B2
(45) Date of Patent: Mar. 25, 2025

(54) HEAT SHIELD

(71) Applicant: Oerlikon Friction Systems (Germany) GMBH, Bremen (DE)

(72) Inventors: Heribert Walter, Bamberg (DE); Michael Maag, Herrieden (DE); Tobias Fritz, Seukendorf (DE); Markus Gradler, Erlangen (DE); Jessica Uhlemann, Bubenreuth (DE); Thomas Ubler, Nuremberg (DE)

(73) Assignee: Oerlikon Friction Systems (Germany) GMBH, Bremen (DE)

( * ) Notice: Subject to any disclaimer, the term of this patent is extended or adjusted under 35 U.S.C. 154(b) by 742 days.

(21) Appl. No.: 17/605,614

(22) PCT Filed: Apr. 29, 2020

(86) PCT No.: PCT/EP2020/061915
§ 371 (c)(1),
(2) Date: Oct. 22, 2021

(87) PCT Pub. No.: WO2020/221808
PCT Pub. Date: Nov. 5, 2020

(65) Prior Publication Data
US 2023/0030022 A1 Feb. 2, 2023

(30) Foreign Application Priority Data
May 2, 2019 (DE) .............. 10 2019 111 353.9

(51) Int. Cl.
*H01M 10/658* (2014.01)
*H01M 10/0525* (2010.01)
(Continued)

(52) U.S. Cl.
CPC ..... *H01M 10/658* (2015.04); *H01M 10/0525* (2013.01); *H01M 10/625* (2015.04);
(Continued)

(58) Field of Classification Search
CPC .................................................. H01M 10/658
See application file for complete search history.

(56) References Cited

U.S. PATENT DOCUMENTS

| 5,626,982 A * | 5/1997 | Kawai ............... B32B 5/18 |
| | | 428/318.6 |
| 2011/0079456 A1 | 4/2011 | Borumand et al. |

(Continued)

FOREIGN PATENT DOCUMENTS

| CN | 107408718 A | 11/2017 |
| CN | 207233906 U | 4/2018 |

(Continued)

OTHER PUBLICATIONS

Notification on sending of the International Preliminary Report on patentability, "Mitteilung Uber Die Ubersendung Des Internationalen Vorlaufigen Berichts Zur Patentierbarkeit," International Application PCT/EP/2020/061915 dated Apr. 29, 2020.

(Continued)

*Primary Examiner* — Nathanael T Zemui
(74) *Attorney, Agent, or Firm* — Hinckley Allen & Snyder; Stephen Holmes

(57) ABSTRACT

The present invention relates to a heat shield (1) for use in systems and apparatuses which are operated by batteries, in particular for electric vehicles, wherein the heat shield (1) is constructed at least from an impact-absorbing layer (4), from a heat-protection layer (5) made of a material which is resistant to high temperatures, optionally from a gas-tight, heat-distributing layer (8), and from a layer (6) with intumescent properties and also from a carrier plate (7) for the layers, which provides shielding.

18 Claims, 2 Drawing Sheets

Figure 1:
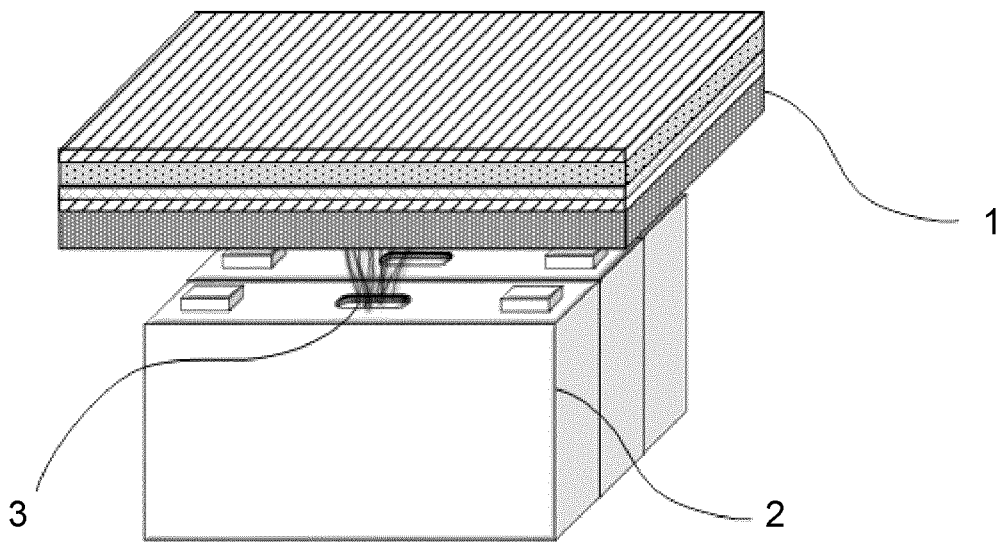

(51) Int. Cl.
  *H01M 10/625* (2014.01)
  *H01M 50/24* (2021.01)
  *H01M 50/242* (2021.01)

(52) U.S. Cl.
  CPC ......... *H01M 50/24* (2021.01); *H01M 50/242* (2021.01); *H01M 2220/20* (2013.01)

(56) References Cited

U.S. PATENT DOCUMENTS

| | | | |
|---|---|---|---|
| 2017/0183082 | A1 | 6/2017 | Contzen et al. |
| 2017/0301968 | A1* | 10/2017 | Cooney ............... H01M 50/457 |
| 2021/0197520 | A1* | 7/2021 | Li ............................ B32B 3/02 |
| 2022/0021046 | A1* | 1/2022 | Shi ....................... H01M 50/112 |

FOREIGN PATENT DOCUMENTS

| | | |
|---|---|---|
| CN | 207425974 U | 5/2018 |
| JP | H04-085840 U | 11/1993 |
| JP | H11138678 A | 5/1999 |
| JP | 2013244118 A | 9/2013 |
| JP | 2018512700 A | 5/2018 |
| JP | 2018206605 A | 12/2018 |
| WO | 2016138463 A1 | 9/2016 |

OTHER PUBLICATIONS

Written notification from the authority responsible for the International Preliminary Examination, "Schriftlicher Bescheid Der Mit Der Internationalen Vorlaufigen Prufung Beauftragten Behorde," International Application PCT/EP2020/061915 dated Apr. 29, 2020.
Notification of the submission of the International Search Report and the Written Decision of the International Investigative Agency or the declaration, "Mitteilung Uber Die Ubermittlung Des Internationalen Recherchenberichts Und Des Schriftlichen Bescheids Der Internationalen Recherchenbehorde Oder Der Erklarung," International Application PCT/EP2020/061915 dated Apr. 29, 2020.
Bauernfeind, Thomas BSc., Diploma Thesis—Investigations into Thermal Energy Storage on a Latent Heat Storage One-Pipe System, "Diplomarbeit-Untersuchungen zur thermischen Energiespeicherung an einem Latentwarmespeicher-Einrohr-System," Technical University of Wein, Nov. 2018.
Chinese Examination report for CN Application No. 202080033198.7, Report issued Jul. 31, 2024 (english translation).

\* cited by examiner

HEAT SHIELD

The present invention relates to a heat shield for use in electric systems and apparatuses that are operated with batteries, nowadays usually lithium ion batteries. In particular, the present invention relates to heat shields for electric vehicles.

Battery-operated vehicles are becoming increasingly widespread as an environmentally compatible alternative to conventional vehicles with combustion engines.

Nowadays, first and foremost, rechargeable lithium ion batteries (LIBs) are utilized for the operation of electric vehicles. For this purpose, a plurality of battery cells are combined to form modules, which are combined to form packs, which are installed in the vehicle.

One problem is the operating safety of cells and cell packs. In general, it is envisaged to keep the battery cells in a temperature range of between 15 and 35° C., this being achieved by corresponding cooling or heating, depending on the operating state of the battery system. In extreme cases that are due to, for example, overcharging, overheating, or short-circuiting in a cell, so-called "thermal runaway" can ensue, that is, an uncontrollable heating that can even lead to fire and explosion of the cells. This is a cascading process in which there is a reciprocal buildup of mutually influencing physical and chemical processes, leading to a continuous temperature increase in the cell. As a result of this, particularly the components of the electrolytes are converted to the gas phase as a function of their boiling point and this, in turn, leads to a rise in pressure in the cell.

An electrolyte is composed of different components, with some of these components having relatively low boiling points of only 90.5° C. (dimethyl carbonate, DMC) or of somewhat greater than 100° C. (ethyl methyl carbonate, EMC: 107.5° C.; methyl butyrate, MB: 102° C.).

Provided in the battery housings are safety valves, which open when the cell pressure is increasing so as to be able to release the reaction gases that are formed during overheating in the battery cells. A stream of particles made up of decomposition products is entrained with the hot gases at high speed. These solid decomposition products are formed owing to the melting of the current collectors and the decomposition of the electrode coatings.

The pressure release resulting from the valve opening leads to an abrupt release of a highly flammable gas-particle mixture from the cell with a temperature of initially 400° C. to 700° C. and a high speed of up to 400 m/s. The particle stream hereby amounts to up to 100 g in the first minute depending on the cell size. The escaping gas generally ignites in air, so that the temperatures can rise rapidly up to 800° C. to 1,400° C. for approximately 30 to 60 seconds. Afterwards, a slow cooling of the burned-out cell commences.

The extreme heat and high impact speed of the gas and particle stream represents a great safety risk and a great challenge for thermal insulation materials.

For the use of battery systems of this type in vehicles, therefore, it is absolutely essential to protect the battery cover and thus indirectly the passenger compartment from the extremely high temperatures and the impact force of the particle stream in order to ensure the safety of passengers.

Usually, a heat protection above the safety valve of the cell or, in general, above the cells, such as, for example, a module cover, or else directly below it or combined with the battery cover is used, the function of which is, first and foremost, the protection of the passenger compartment lying above the battery system from a high thermal exposure. The goal is to keep as low as possible the temperature that, in the case of a "thermal runaway," acts on the vehicle floor, ideally below 200° C., and to prevent any direct entry of flames. Furthermore, it is necessary to absorb the impact force of the particles resulting from the high impact speed in order to prevent damage, in particular damage to the passenger compartment.

Therefore, a heat shield has to fulfill at least three functionalities in order to be effective:

1. It must be able to absorb the particle impact at temperatures of 700° C. to 1400° C.
2. It must have a high-temperature stability up to temperatures of 1000° C. to 1400° C. over at least 120 seconds when a blow-out is in progress; and
3. It must be able to dissipate the high temperatures arising during a blow-out to the extent that the temperatures on the side of the heat shield facing away from the battery, that is, on the side on which the passenger compartment lies in a vehicle, do not exceed 400° C. and ideally values of less than 200° C. can be maintained.

A further requirement for the use in, for example, electric vehicles, ensues from the limited available space. Thus, the heat shield should take up as little space as possible, but still be able to afford the required protection.

In accordance with the invention, this object is achieved by a heat shield that is composed of a plurality of layers of various materials, which, in combination, are able to fulfill the different requirements presented above, which are posed for an effective blow-out protection.

The heat shield according to the invention has a first layer made from a thermally resistant elastomer or from a fiber composite with an elastomer matrix, which, through elastic deformation, can compensate for the impact force of the particles striking with a high impact speed and, in addition, prevents any mechanical damage to the following layers as a result of the impact of the particles. This first layer is usually the layer that lies closest to the battery cells.

There follows a second layer made from a material that is resistant to high temperatures, which can even withstand temperatures of up to 1400° C. for approximately 60 seconds; a third layer made from an intumescent material, which, under the action of heat, exhibits a swelling or expansion behavior and, owing to the swelling, forms an insulating layer, which acts as a heat shield.

As a preferred embodiment, it is possible to arrange between the second and third layer a heat-distributing layer, which can distribute the heat coming from the second layer over a larger area and thus thermally expose the intumescent layer over a larger area, as a result of which the intumescent effect can be enhanced.

In addition, it is possible for increasing the stability of the stack to provide a carrier layer as uppermost layer for the functional layers.

The length and width of the layers are governed by the dimensions of the battery arrangement, taking into consideration the flight path of a gas and particle stream when there is a release of gas from the valves.

The total thickness and thus the thickness of the individual layers of the heat shield composite is predetermined essentially by the available space. For use in electric vehicles, as a rule, a total thickness of no more than 1.5 mm is desired.

Starting from a targeted total thickness of the heat shield composite of 1.5 mm, the mean thickness of the individual layers lies at 0.3 mm with a variation between 0.2 mm and 0.5 mm.

The thickness of the individual layers is determined appropriately by their function in the stack. For example, the thickness of the heat protection layer lies more in the larger range and the thickness of the heat-distributing layer lies more in the lower range.

As needed, the layers or individual layers can be stitched together in order to prevent, for example, any unintended detachment. Thus, it has proven advantageous to stitch the intumescent layer with the underlying and/or overlying arranged layer in order to prevent a detachment resulting from swelling. As stitching material, it is possible to use thermally resistant threads, such as those known from fire protection. Examples are aramide threads, such as those marketed, for example, under the product names Kevlar® or Nomex®.

A great advantage of the heat shield composite stack according to the invention is its very good 3D deformability. This means that the shield readily deforms and thus can adapt to the structural requirements and spatial circumstances of its place of use or purpose of use.

The present invention will be described in detail below, including the design and composition of the individual layers, with reference to the appended figures, whereby the figures show examples of embodiments of the heat shield according to the invention.

Figure 2:
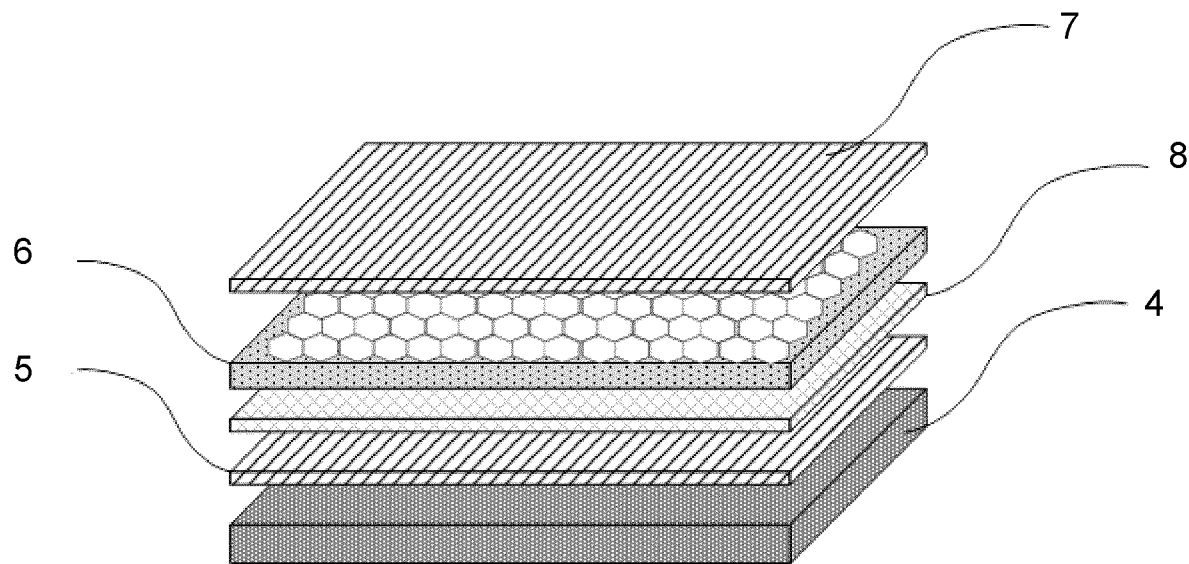
Figure 3:
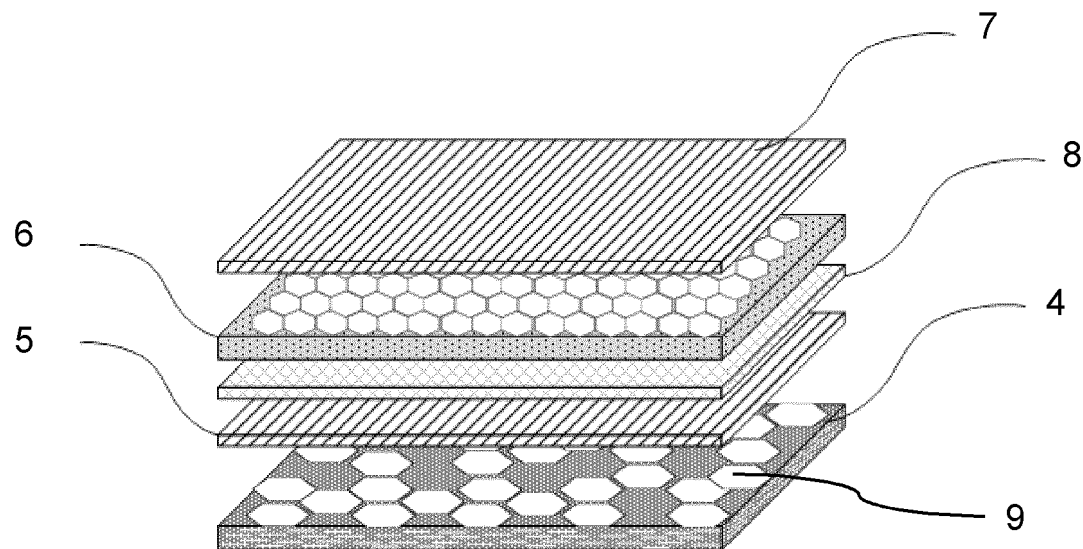
Figure 4:
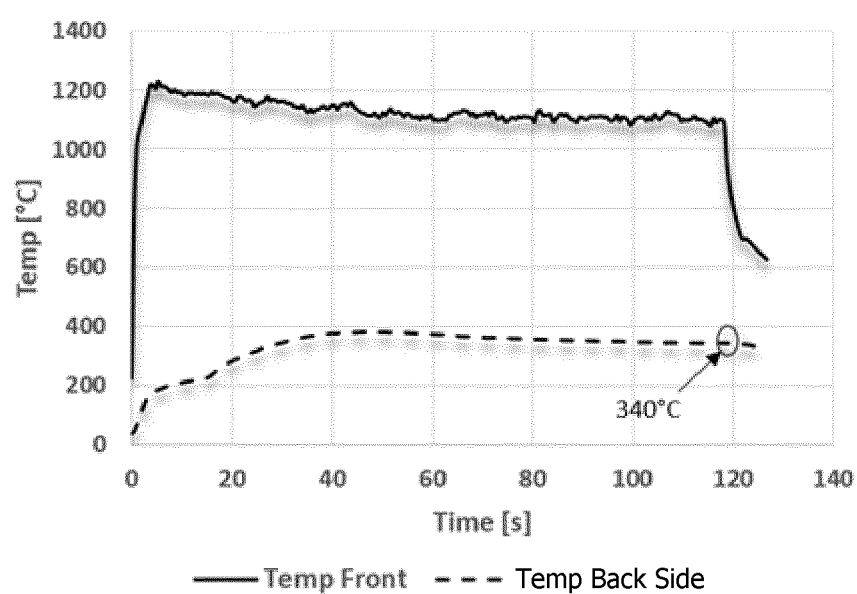

Shown are:

FIG. 1 an arrangement of a heat shield according to the invention above a battery module, FIG. 2 an exploded illustration of the heat shield in FIG. 1, FIG. 3 a further embodiment of a heat shield according to the invention, and FIG. 4 a diagram with a comparison of the plot of temperature over time on the side of the heat shield facing the battery as well as on the side facing away from the battery in the event of a battery failure.

The impact-absorbing layer is the layer of the heat shield composite that lies closest to the battery arrangement. Therefore, it is referred to as the "first" or "bottommost" layer of the stack.

In the arrangement according to FIG. 1, the heat shield 1 is situated above the surface of a battery module 2 that has the safety valves 3. If, as a result of a fire, for example, the battery ensemble fails, the hot gas that is forming escapes together with the likewise forming particles consisting of decomposition products through the existing safety valves 3 in the direction of the heat shield 1.

The gas and particle stream is indicated in FIG. 1 by a dark line-shaped cloud, which rises from the safety valve 3 in the direction of the heat shield 1.

The heat shield 1 checks the impact force of the hot gas and particle stream, which strikes the bottom side of the heat shield 1 at high speed, and, at the same time, protects the side facing away from the battery, which, for example in vehicles, is the side with the passenger compartment, against high temperatures.

FIG. 2 shows the layer structure of the heat shield 1 illustrated in FIG. 1.

The heat shield 1 is constructed from a plurality of layers made of different materials, which, in combination, on the one hand, compensate for the impact force of the hot gas and particle stream and, on the other hand, dissipate heat, so that the side of the heat shield 1 opposite the hot stream is protected against the high temperatures on the impact side of the heat shield 1.

The first layer 4 is composed of an elastomer that is resistant to high temperatures and has impact-absorbing properties, which, through elastic deformation, can compensate for the impact of the gas and particle stream impinging at high speed and, at the same time, can withstand the high thermal exposures of up to approximately 400° C. to 450° C. In accordance with the invention, this first layer 4 is therefore also referred to as an "impact-absorbing layer."

Examples of suitable elastomers are silicone elastomers, such as, for example, fluoro-vinyl-methyl silicone rubber (FVMQ), methyl-phenyl silicone rubber (PMQ), methyl-phenyl-vinyl silicone rubber (PVMQ), methyl silicone rubber, methyl-vinyl silicone rubber (VMQ), ethylene-propylene-diene rubber (EPDM), styrene-butadiene rubber (SBR), acrylic nitrile-butadiene rubber (NBR), natural rubber (NR), butyl rubber, isobutene-isoprene rubber (IIR), and isoprene rubber (IR).

As an especially effective embodiment, it is possible to incorporate mineral fibers into this elastomer layer. Suitable examples are basalt fiber fabric or silicate fiber fabric with an area density of 100 to 600 g/m$^2$.

The main purpose of the impact-absorbing layer 4 is, at the beginning, to trap the very high particle load of the impinging gas and particle stream. This very high exposure by the particle impact at the beginning leads, in general, to an at least partial removal of the layer 4. However, because the particle load after the first impingement markedly declines, an adequate protection of the further layers is ensured by the subsequent heat-absorbing layer 5.

The subsequent second layer 5 serves as heat protection against the extreme temperatures during the high-temperature phase of the uncontrolled breakout of gas. For an effective protection of a passenger compartment, it has to be able to withstand the highest thermal exposures of temperatures of up to 1400° C. over approximately 60 seconds. In accordance with the invention, this second layer 5 is therefore also referred to as a "heat protection layer."

Accordingly, it is composed of a material that has a resistance to high temperatures.

Examples of materials of this kind that are resistant to high temperatures are mica materials, basalt fiber composites, oxide ceramic composites, and silica fiber composites.

The heat protection layer 5 protects, at the same time, the following layers against any damage due to particle impact in the event that particles cannot be trapped adequately by the first layer 4.

Between the heat protection layer 5 and the intumescent layer 6, a heat-distributing layer 8 is preferably provided, as shown in FIG. 2.

The heat-distributing layer 8 serves for distribution of the heat over a larger area in order to reduce the thermal area load of the heat shield.

It is of advantage when this layer, which has a high thermal conductivity, also possesses thermal properties that are as strongly anisotropic as possible, so that the heat coming from the heat-distributing layer 8 is introduced in a distributed manner over a larger area in the following arranged layer 6 with intumescent properties and the layer 6 with intumescent properties can expand over a large area at the same time and thus can form a continuous insulating layer.

Furthermore, it is favorable when the heat-distributing layer 8 is as gastight as possible so as thereby to support the intumescent effect of the layer 6. The gas tightness prevents the expanding gases that form during activation of the intumescent layer 6 from escaping via the heat-distributing layer 8 and thus no longer being available for swelling of the layer 6.

Examples of suitable materials with high thermal conductivity and the desired strong anisotropic thermal properties for the formation of the heat-distributing layer 8 are, for example, graphite films, carbon fibers, and ceramic films based on hexagonal boron nitride (HBN), with graphite film being especially preferred.

The intumescent layer 6 is formed from an intumescent material or contains an intumescent material. Under the effect of heat, this layer swells and forms an insulating layer as additional thermal protection.

The use of mineral nonwovens or carbon or glass nonwovens or felts as a thermal insulating layer was known, although, on account of their generally greater layer thickness, they increase the total thickness of the heat shield and thus its space requirement.

In contrast to this, the intumescent material used in accordance with the invention can be deposited in just thin layers, which, if necessary, swell under the effect of heat, namely, in that they release noncombustible expanding gasses, such as, for example, nitrogen, carbon dioxide, or ammonium gases.

Intumescent materials, such as those that can also be used in accordance with the invention, are, in general, known from flame protection. Examples are expandable graphite and layer silicates based on aluminum silicate clay minerals, such as clay minerals from the illite group, etc.

These intumescent materials are usually embedded in a polymer matrix, which, under the effect of prevailing high temperatures, is carbonized or vitrified and forms a hard surface as rapidly as possible. Examples of polymer materials for the matrix are acrylic resins, epoxide resins, melamine resins, ethylene-vinyl acetate, etc.

The composites made of intumescent material and matrix material can be processed into thin layers, for which purpose it is possible to employ technologies such as, for example, screen printing, knife coating, application of thin films, etc.

In accordance with a special embodiment, the intumescent composites made of intumescent material and matrix material can be introduced into a carrier structure. In this way, it is possible to improve the mechanical rigidity. In addition, if need be, it is possible to achieve larger layer thicknesses and consequently a greater swelling effect. What is involved in the case of the carrier structures are open or closed hollow chamber structures. Examples are honeycomb structures, with the geometry of the honeycomb being chosen depending on requirement, and open-pore nonwovens and felts reinforced with resin, etc.

An intumescent effect can be achieved through the use of resin systems and the thermal decomposition thereof. To this end, it is possible to use, among other things, Si resins, elastomers, epoxy resins, etc.

It has proven especially favorable to use a combination of a heat protection layer 5, a gastight heat-distributing layer 8, and an intumescent layer 6. As described above, the gastightness of the layer 8 prevents any escape of the expanding gases forming during activation of the layer 6, with the heat protection layer 5 protecting the heat-distributing layer 8 against any mechanical damage and any impairment of the gas tightness due to particles of the gas and particle stream.

In addition, the intumescent layer 6 can be stitched with an underlying and/or overlying arranged layer in order to prevent any detachment of the layer 6 owing to the expanding gases that are formed. For example, in the embodiment shown in FIG. 2, the layer 6 can be stitched with the heat-distributing layer 8 and/or with a following carrier plate 7. As stitching material, it is possible to use the above-mentioned aramide fibers.

The upper closure of the heat shield composite stack 1 according to the invention is formed by a carrier plate 7, which mechanically supports the further layers.

The carrier plate 7 can be a glass-fiber composite, a carbon fiber composite, a basalt fiber composite, a SMC (sheet molding compound) composite, or a mica-based plate. For the carrier plate 7, it is also possible to use plastics that can withstand mechanical loads and are sufficiently resistant to high temperatures.

In addition, for further mechanical stabilization, the heat shield composite stack 1 according to the invention can be encased further with a thin layer made of fiberglass or another material with a corresponding ability to withstand mechanical and thermal loads.

As needed, fillers can be added to the impact-absorbing elastomer layer 4 for specific adjustment of the material properties. The adjustment of the material properties of polymers by adding fillers and the choice of suitable filling degrees are known to the person skilled in the art.

It is possible to use fillers that allow the thermal conduction within the layer 4 as well as the temperature resistance to be improved. Examples are graphite, hexagonal boron nitride (HBN), silicon carbide (SIC), aluminum hydroxide (ATH), metal particles, carbon fiber fabric, C short cut fibers, C ground fibers, etc.

It is possible to add fillers that assist the carbonization, vitrification, and intumesence of the layer 4 in the high-temperature range, such as, for example, aluminum hydroxide (ATH), magnesium hydroxide (MGH, $Mg(OH)_2$), red phosphorus, oxides such as borax ($Na_2[B_4O_5(OH)_4] \times 8 H_2O$), antimony oxide ($Sb_2O_3$), expandable graphite, clay minerals from the illite group, etc.

In accordance with a further embodiment, it is possible to provide heat-distributing fillers in the impact-absorbing layer 4. Heat-distributing fillers support the distribution of the heat of the hot gas and particle stream over the entire surface of the first layer 4 and thus ensure thermal relief, in particular at points on which the hot gas and particle stream first impinges.

An example for an embodiment involving the addition of heat-distributing fillers to the layer 4 is illustrated in FIG. 3, in which the heat-distributing fillers 9 are illustrated as a pattern consisting of hexagons that are arranged in distribution over the surface. There follow, as in the embodiment in accordance with FIG. 2, a layer 5 that is resistant to high temperatures, a heat-distributing layer 8, an intumescent layer 6, and the carrier plate 7.

EXAMPLE

The temperature plot of a heat shield according to the invention is measured and the plot on the side that lies closest to the battery arrangement (impact-absorbing layer 4) is compared to the plot on the side that lies furthest from the battery arrangement (carrier plate 7).

The construction of the heat shield composite stack was as follows in the sequence from the bottommost layer 4 to the topmost layer 7:

Impact-absorbing layer 4: fiber composite consisting of basalt fiber fabric with an area weight of 400 g/m² with an elastomer matrix (Shore A 25/40), thickness 0.3 mm;

Heat protection layer 5: fiber composite consisting of silicate fiber fabric with an area weight of 300 g/m² and an elastomer matrix, thickness 0.3 mm;

Heat-distributing layer 8: graphite film, thickness 0.2 mm;

Intumescent layer 6: thickness 0.4 mm, made from an elastomer material that decomposes at temperatures of around 300° C.;

Carrier plate 7: thickness 0.3 mm;

with the layer 6 being stitched together with the layer 8 by use of aramide threads in the X and Y direction in such a shape that fields of 50 mm×50 mm in size resulted.

The stitching prevents any partial detachment of the heat-distributing layer 8 and the carrier layer owing to the expanding gases that are formed.

The result is shown in the diagram in FIG. 4.

Whereas the temperature on the side with the impact-absorbing layer 4 (Temp Front) also was markedly above 1000° C. even after 120 seconds, it was only 340° C. on the back side (carrier plate 7).

This result shows that, in the event of "thermal runaways" with initial temperatures of 1200° C., by use of the heat shield composite stack according to the invention, the temperatures on the back side of the heat shield can be kept in a magnitude of only 340° C. even over a period of 120 seconds and thus it is possible to ensure a significant protection on this side—for example, on the passenger side of a vehicle.

LIST OF REFERENCE NUMBERS 1. heat shield
2. battery
3. burst valve or safety valve
4. impact-absorbing first layer
5. layer resistant to high temperatures (heat protection layer)
6. intumescent layer (insulating layer)
7. carrier plate
8. heat-distributing layer
9. heat-distributing fillers

The invention claimed is:

1. A heat shield (1) suitable for batteries or battery arrangements (2),
    wherein the heat shield (1) has a layer structure made of a first layer (4) based on a temperature-resistant elastomer for impact absorption, a second layer (5) made of a material that is resistant to high temperatures as heat protection, a layer (6) having intumescent properties for creation of a thermal insulation, a carrier plate (7), and a heat-distributing layer (8) between the second layer (5) and the layer (6) with intumescent properties.

2. The heat shield according to claim 1,
    wherein the second layer (5) is made of materials selected from the group consisting of mica materials, basalt materials, basalt fiber composites, oxide ceramic composites, silica fiber composites and combinations thereof.

3. The heat shield according to claim 1,
    wherein the layer stack is encased with a shell made from a material with the ability to withstand mechanical and thermal loads.

4. The heat shield according to claim 3,
    wherein the shell is made of fiberglass.

5. The heat shield according to claim 1,
    wherein the impact-absorbing layer (4) contains fillers for improving the thermal conduction and/or the temperature resistance, for assisting carbonization, vitrification, and/or intumescence, and/or heat-distributing fillers (9).

6. The heat shield according to claim 1,
    wherein the layer (6) with intumescent properties is formed from a carrier plate that contains an intumescent material.

7. The heat shield according to claim 1,
    wherein at least the layer (6) with intumescent properties is stitched with an underlying and/or overlying arranged layer.

8. A use of a heat shield according to claim 1 in a battery-operated apparatus as a protection from the effects of a hot gas and particle stream exiting the battery in the event of a failure.

9. The use according to claim 8,
    wherein the battery-operated apparatus is an electric means of transportation.

10. The use according to claim 8,
    wherein the battery is a lithium ion battery.

11. The heat shield according to claim 2,
    wherein the layer stack is encased with a shell made from a material with the ability to withstand mechanical and thermal loads.

12. The heat shield according to claim 11,
    wherein the shell is made of fiberglass.

13. The heat shield according to claim 2,
    wherein the impact-absorbing layer (4) contains fillers for improving the thermal conduction and/or the temperature resistance, for assisting carbonization, vitrification, and/or intumescence, and/or heat-distributing fillers (9).

14. The heat shield according to claim 2,
    wherein the layer (6) with intumescent properties is formed from a carrier plate that contains an intumescent material.

15. The heat shield according to claim 2,
    wherein at least the layer (6) with intumescent properties is stitched with an underlying and/or overlying arranged layer.

16. A use of a heat shield according to claim 2 in a battery-operated apparatus as a protection from the effects of a hot gas and particle stream exiting the battery in the event of a failure.

17. The use according to claim 16,
    wherein the battery-operated apparatus is an electric means of transportation.

18. The use according to claim 8,
    wherein the battery is a lithium ion battery.

* * * * *